United States Patent
Mizushima et al.

(10) Patent No.: US 7,221,510 B2
(45) Date of Patent: May 22, 2007

(54) METHOD OF PRODUCING POLARIZING FILM, POLARIZING FILM AND IMAGE DISPLAY DEVICE USING THE SAME

(75) Inventors: Hiroaki Mizushima, Ibaraki (JP);
Tadayuki Kameyama, Ibaraki (JP);
Ken Aoki, Ibaraki (JP); Morimasa Wada, Ibaraki (JP); Yoichiro Sugino, Ibaraki (JP); Kenji Shimizu, Ibaraki (JP)

(73) Assignee: Nitto Denko Corporation, Ibaraki-shi, Osaka (JP)

(*) Notice: Subject to any disclaimer, the term of this patent is extended or adjusted under 35 U.S.C. 154(b) by 0 days.

(21) Appl. No.: 10/830,322

(22) Filed: Apr. 23, 2004

(65) Prior Publication Data

US 2004/0212885 A1    Oct. 28, 2004

(30) Foreign Application Priority Data

Apr. 25, 2003  (JP)  ............................ P2003-121906
Apr. 22, 2004  (JP)  ............................ P2004-127263

(51) Int. Cl.
*G02B 5/30*  (2006.01)
*G02B 27/28*  (2006.01)

(52) U.S. Cl. ..................... 359/490; 359/491; 359/492

(58) Field of Classification Search ......... 359/490–492
See application file for complete search history.

(56) References Cited

U.S. PATENT DOCUMENTS

| | | | |
|---|---|---|---|
| 2,612,079 A * | 9/1952 | Mahler ..................... 156/229 |
| 6,760,156 B2 * | 7/2004 | Tsuchimoto et al. ........ 359/492 |
| 6,814,899 B2 * | 11/2004 | Cael et al. .................. 264/1.34 |
| 2001/0055153 A1 * | 12/2001 | Moshrefzadeh et al. .... 359/490 |
| 2002/0063243 A1 * | 5/2002 | Matsumoto et al. ........ 252/585 |
| 2002/0182427 A1 * | 12/2002 | Kondo et al. ............... 428/522 |
| 2003/0062645 A1 * | 4/2003 | Nishida et al. .............. 264/78 |
| 2003/0067683 A1 * | 4/2003 | Tsuchimoto et al. ........ 359/492 |

FOREIGN PATENT DOCUMENTS

| | | | |
|---|---|---|---|
| CN | 1384396 A | | 12/2002 |
| JP | 10-160935 A | | 6/1998 |
| JP | 10-332936 A | * | 12/1998 |
| JP | 2001-290024 A | | 10/2001 |
| JP | 2001-296427 A | | 10/2001 |
| JP | 2001-337224 A | * | 12/2001 |
| JP | 2002-189127 A | | 7/2002 |

(Continued)

OTHER PUBLICATIONS

PTO 05-3411, "Method for Manufacturing a Color Polarization Film", English-language translation of JP 2001-337224 A (Toshiba Corp), Schreiber Translations, Inc., U.S. Patent and Trademark Office, Apr. 2005.*

(Continued)

*Primary Examiner*—Drew A. Dunn
*Assistant Examiner*—Joshua L. Pritchett
(74) *Attorney, Agent, or Firm*—Westerman, Hattori, Daniels & Adrian LLP (57) ABSTRACT

A process for producing a polarizing film including a step of stretching a raw film, wherein the ratio (L/W) of stretching distance (L) to width of initial raw film (W) is from 0.5 to 30.

49 Claims, 1 Drawing Sheet

| | FOREIGN PATENT DOCUMENTS | | |
|---|---|---|---|
| JP | 2002-202411 | | 7/2002 |
| JP | 2002-258045 A | * | 9/2002 |
| JP | 2002-267844 | | 9/2002 |
| JP | 2002-326278 | | 11/2002 |
| JP | 2002-333521 A | | 11/2002 |
| KR | 1997-0025950 A | | 6/1997 |
| KR | 2003-0026763 A | | 4/2003 |

OTHER PUBLICATIONS

Office Action of Corresponding Chinese Application No. 200410038431.3 issued Jun. 2, 2006.

Office Action of Corresponding Japanese Patent Application No. 2004-127263 mailed Feb. 2, 2007.

* cited by examiner

METHOD OF PRODUCING POLARIZING FILM, POLARIZING FILM AND IMAGE DISPLAY DEVICE USING THE SAME

FIELD OF THE INVENTION

The present invention relates to a method for producing a polarizing film used in an image display device such as a liquid crystal display, an electroluminescence (EL) display device, a plasma display (PD), a field emission display (FED), etc., especially used in a liquid crystal display, and a polarizing film produced by the production method. It also relates to an optical film having at least one optical layer laminated on the polarizing film, and an image display device having the polarizing film or the optical film.

BACKGROUND OF THE INVENTION

A polarizing film used in an image display device (especially, a liquid crystal display) needs to have both high transmittance and high polarizing efficiency to provide an image bright and good in color reproducibility. This type polarizing film has been heretofore produced in such a manner that a dichroic substance such as dichroic iodine or dichroic dye is oriented on a polyvinyl alcohol (PVA) film.

Improvement in optical characteristic and improvement in in-plane uniformity as well as increase in size of a polarizing plate used in a liquid crystal display have been required recently with the advance of increase in size of the liquid crystal display, improvement in function and improvement in luminance. It is necessary to uniaxially stretch a wide raw film evenly to obtain a large-size polarizing plate. This is however a very difficult process in practice. Optical characteristic as well as in-plane uniformity shows a tendency to worsening. When the in-plane optical characteristic is not uniform, display irregularity occurs in a formed image display device to cause a remarkable problem. A wet stretching method and a dry stretching method are mainly known as a stretching method for aligning the dichroic substance. As a method for obtaining a polarizing film having a high orientation degree from a wide raw film, several proposals have been made mainly on the dry stretching method (e.g., see Reference 1).

[Reference 1]

JP A 2002-326278 (the term "JP-A" as used herein refers to an "unexamined published Japanese patent application)

In the aforementioned method, there is however a problem that in-plane uniformity is lowered as well as the uniaxial characteristic of the oriented film is lowered. An object of the present invention is to provide a method for producing a polarizing film uniform in in-plane optical characteristic and high in orientation degree even in the case where a wide raw film is used. Another object of the present invention is to provide a polarizing film produced by the production method, an optical film as a laminate of the polarizing film and another optical layer, and an image display device using the polarizing film or the optical film.

SUMMARY OF THE INVENTION

The present inventors have made eager investigation to examine the problem. As a result, it has been found that the foregoing objects can be achieved by the following method for producing a polarizing film. With this finding, the present invention is accomplished.

The present invention relates to a method of producing a polarizing film, wherein in a process of producing a polarizing film, inclusive of a process of stretching a raw film, the ratio (L/W) of stretching distance (L) at the stretching process to width of initial raw film (W) is in a range of from 0.5 to 30, both inclusively.

The present invention also relates to a polarizing film produced by the production method. Preferably, the polarizing efficiency of the polarizing film is in a range of from 99.90% to 100%, both inclusively. Preferably, the crossed transmittance of the polarizing film is in a range of from 0.0% to 0.050%, both inclusively. The present invention further relates to an optical film including the polarizing film, and at least one optical layer laminated on the polarizing film.

The present invention further relates to an image display device such as a liquid crystal display, an electroluminescence (EL) display device, a plasma display (PD), a field emission display (FED), etc. using either of the polarizing film and the optical film.

The reference numerals used in the drawings denote the followings, respectively.

1: initial raw film
2: pinch roll
3: guide roll
4: polarizing film
5: bath
6: drying step
7: sample
51: swelling step
52: dyeing step
53: crosslinking step
54: stretching step
55: water-washing step
L: stretching distance
W: width of initial raw film
W1: position of measuring width of initial raw film

DETAILED DESCRIPTION OF THE INVENTION

In a method of producing a polarizing film according to the present invention, the ratio (L/W) of stretching distance (L) at a stretching process to width of initial raw film (W) is in a range of from 0.5 to 30, both inclusively. In this case, the process including the stretching process may be repeated by two or more cycles in the process of producing the polarizing film if at least one cycle of the process including the stretching process can satisfy the aforementioned condition. It is preferable that at least two cycles of the process including the stretching process satisfy this condition respectively. It is especially preferable that all cycles of the process including the stretching process satisfy this condition respectively. When the stretching process is repeated by two or more cycles in the process of producing the polarizing film, the value of L/W may vary according to the cycle.

In the present invention, the higher the total stretching ratio of a producing process becomes, the higher the effect of enhancing the uniformity of the film is. Therefore, it is preferable to apply the method of the present invention in a producing process having the total stretching ratio of not less than 2.5, more preferably not less than 3.5. Furthermore, it is preferable to apply the method of the present invention to a step of curing a film such as the crosslinking step and the curing step, or also preferable to apply the method of the present invention to a step after a film-curing-step such as the crosslinking step and the curing step.

Figure 1:
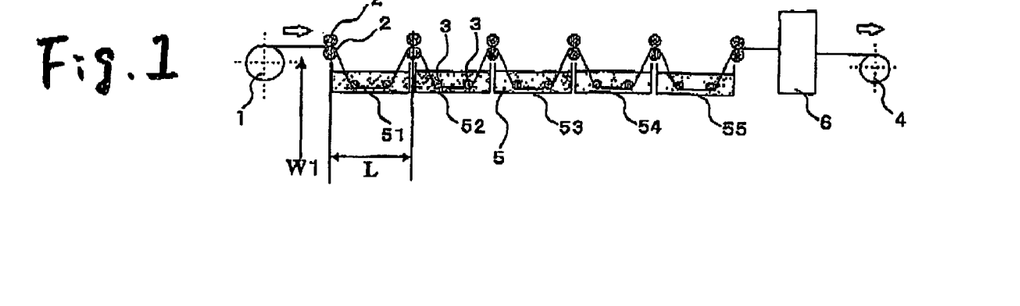
FIG. 1 is a drawing typically showing an example of the producing process of a polarizing film of the present invention.
Figure 2:
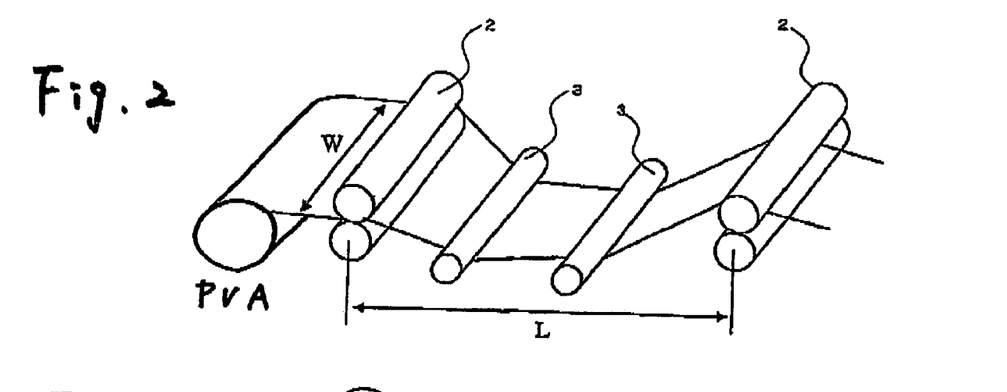
FIG. 2 is a schematic drawing typically showing a stretched portion in one producing step using rollers.

In the present invention, the total stretching ratio stands for the ratio of a length of a polarizing film before performing any steps to a length of the polarizing film after performing all the steps. The individual value of L/W can be selected suitably in accordance with various conditions. The stretching distance (L) means a distance between portions on which force necessary for stretching is applied. For example, as shown in FIG. 1, in the case of roll stretching, the stretching distance (L) is a direct distance obtained when central positions in respective sections of two rolls used for stretching are connected to each other by a line. The width of initial raw film (W) means the width of the raw film before a series of polarizing film producing steps are executed. In FIG. 2, for example, the stretching length (L) is a distance between pinch rolls that substantially stretch the film, the film being stretched may be bent via guide rolls as shown. In FIG. 1, the stretching distance (L) indicates a distance between the two rolls in the swelling step, but it is not to be construed as being limited to the distance thereof.

If the value of L/W is smaller than 0.5, uniaxial orientation characteristic becomes too low to obtain required optical characteristic as a polarizing film. On the other hand, if the value of L/W is larger than 30, practical performance becomes poor because a huge stretching bath is required. The value of L/W is acceptable if it is not less than 0.5, but the value is preferably not less than 1, more preferably not less than 2. Furthermore, as described above, the value of L/W is acceptable if it is not more than 30, but the value is preferably not more than 15, more preferably not more than 13, particularly preferably not more than 12. Especially preferably, the value of L/W is selected to be in a range of from 2 to 12, both inclusively.

The polarizing film is generally prepared in such a manner that an initial raw film made of a polymer film such as a polyvinyl alcohol (PVA) film is dyed with a dichroic substance such as iodine or dichroic dye and uniaxially stretched. The thickness of the polarizing film is not particularly limited but generally selected to be in a range of from about 5 to 80 μm. When a transparent protective layer is laminated on either or each of opposite surfaces of the polarizing film, a polarizing plate can be obtained.

Any type film can be used as the polymer film without particular limitation. Examples of the polymer film include: a PVA film; a polyethylene terephthalate (PET) film; an ethylene-vinyl acetate copolymer film; a hydrophilic high-molecular film such as partially saponified films of these, a cellulose film, etc.; and a polyene oriented film such as dehydrated PVA, dehydrochlorinated polyvinyl chloride, etc. Among these, a PVA film is preferably used because it is excellent in dye-affinity to iodine as a polarizing film as well as excellent in the effect of enhancing in-plane uniformity.

The degree of polymerization of a polymer which is a material of the polymer film is generally from 500 to 10000. It is preferable that the degree of polymerization of the polymer is selected to be in a range of from 100 to 6000. It is more preferable that the degree of polymerization of the polymer is selected to be in a range of from 1400 to 4000. In the case of a saponified film, the saponification value of the saponified film is selected to be preferably not smaller than 75% by mole, more preferably not smaller than 98% by mole, especially preferably in a range of from 98.3 to 99.8% by mole, for example, from the point of view of water-solubility.

When a PVA film is used as the polymer film, a film formed by any method as a method of producing the PVA film can be used suitably. Examples of the method include a flow casting method for forming a film by flow-casting a raw liquid dissolved in water or an organic solvent, a casting method, an extrusion molding method, etc. A film exhibiting a retardation value of from 5 nm to 100 nm on this occasion is preferably used. To obtain a polarizing film excellent in in-plane uniformity, it is preferable that variation of in-plane retardation in the PVA film is as small as possible. The variation of in-plane retardation in the PVA film as the initial raw film is selected to be preferably not larger than 10 nm, more preferably not larger than 5 nm at a measurement wavelength of 1000 nm.

The polarizing film according to the present invention is provided so that single transmittance measured on the polarizing film per se is preferably not lower than 43%, more preferably in a range of from 43.3 to 45.0%. It is preferable that crossed transmittance measured in the condition that two polarizing films produced as described above are prepared and overlap each other so that the absorption axes of the two polarizing films cross each other at 90° is as low as possible. In practical use, the crossed transmittance is selected to be preferably not higher than 0.050%, both inclusively, and more preferably not higher than 0.030%. When the values of crossed transmittance of polarizing film samples extracted from a plurality of points in a plane of the polarizing film are measured at a measurement wavelength of 440 nm and the standard deviations thereof are calculated, data concerning in-plane uniformity of the polarizing film can be obtained. The values of the standard deviations are selected to be smaller than 0.100, preferably smaller than 0.060. In practical use, the polarizing efficiency is selected to be preferably in a range of from 99.90% to 100%, both inclusively, and especially preferably in a range of from 99.93% to 100%, both inclusively. Incidentally, the transmittance and the polarizing efficiency may be measured by a method shown in Examples that will be described later.

Generally, a dry stretching method or a wet stretching method is used as a method for producing the polarizing film. In this invention, a wet stretching method is preferably used. In the process of producing the polarizing film by the wet stretching method, any suitable method can be used in accordance with the condition. For example, a method for producing a polarizing film from a polymer film as the initial raw film by a series of production steps composed of swelling, dyeing, crosslinking, stretching, water-washing and drying is used generally. In all the steps except drying, each step is carried out while the polymer film is immersed in a bath filled with one selected from various kinds of solutions. On this occasion, the sequence of the swelling, dyeing, crosslinking, stretching, water-washing and drying steps, the number of repeating cycles in each step and the presence/absence of execution of each step are not particularly limited. Several steps may be carried out simultaneously in one process or several steps may be omitted. For example, the stretching step may be carried out after the dyeing step or may be carried out simultaneously with the swelling or dyeing step. Or the stretching step may be carried out before the dyeing step. Any suitable method can be used for the stretching step without limitation. For example, in the case of roll stretching, a method for performing stretching on the basis of the circumferential velocity difference between rolls is used. In each step, additives such as boric acid, borax, potassium iodide, etc. may be added suitably. Therefore, the polarizing film according to the present invention may contain boric acid, zinc sulfate, zinc chloride, potassium iodide, etc. if necessary. In several ones of these steps, the polymer film may be stretched suitably in the flowing direction or in the widthwise direction and the water-washing step may be carried out whenever each step is completed.

In the swelling step, the polymer film is immersed in a swelling bath, for example, filled with water. As a result, dirt and an anti-blocking agent deposited on surfaces of the polymer film can be cleaned because the polymer film is washed with water. Moreover, the effect of preventing unevenness such as dyeing unevenness can be expected because the polymer film is swollen. Glycerin, potassium iodide, etc. may be added suitably into the swelling bath. Preferably, the concentration of added glycerin is not larger than 5% by weight, and the concentration of added potassium iodide is not larger than 10% by weight. The temperature of the swelling bath is selected to be preferably in a range of from 20 to 45° C., more preferably in a range of from 25 to 40° C. The time of immersion in the swelling bath is selected to be preferably in a range of from 2 to 180 seconds, more preferably in a range of from 10 to 150 seconds, especially preferably in a range of from 60 to 120 seconds. The polymer film may be stretched in the swelling bath. The stretching ratio on this occasion is in a range of from about 1.1 to 3.5.

In the dyeing step, the polymer film is immersed in a dyeing bath, for example, filled with a dichroic substance solution containing a dichroic substance such as iodine to thereby make the polymer film adsorb the dichroic substance.

A heretofore known substance can be used as the dichroic substance. Examples of the dichroic substance include iodine, and organic dye. Examples of the organic dye which can be used include red BR, red LR, red R, pink LB, rubin BL, Bordeaux GS, sky blue LG, lemon yellow, blue BR, blue 2R, navy RY, green LG, violet LB, violet B, black H, black B, black GSP, yellow 3G, yellow R, orange LR, orange 3R, scarlet GL, scarlet KGL, Congo red, brilliant violet BK, supra blue G, supra blue GL, supra orange GL, direct sky blue, direct first orange S, first black, etc.

One kind selected from these dichroic substances may be used or two or more kinds selected from these dichroic substances may be used in combination. When the organic dye is used, two or more kinds may be preferably used in combination, for example, in order to attain neutralization of a visible light region. Specific examples of the combination include; Congo red and supra blue G; supra orange GL and direct sky blue; and direct sky blue and first black.

A solution containing the dichroic substance dissolved in a solvent can be used as the solution in the dyeing bath. Water is generally used as the solvent. An organic solvent mutually soluble to water may be added to water. The concentration of the dichroic substance is selected to be preferably in a range of from 0.010 to 10% by weight, more preferably in a range of from 0.020 to 7% by weight, especially preferably in a range of from 0.025 to 5% by weight.

When iodine is used as the dichroic substance, iodide may be preferably added to iodine in order to improve the dyeing efficiency more greatly. Examples of the iodide include potassium iodide, lithium iodide, sodium iodide, zinc iodide, aluminum iodide, lead iodide, copper iodide, barium iodide, calcium iodide, tin iodide, titanium iodide, etc. The ratio of added iodide in the dyeing bath is selected to be preferably in a range of from 0.010 to 10% by weight, more preferably in a range of from 0.10 to 5% by weight. Among these, potassium iodide may be preferably added. The rate (weight ratio) of iodine to potassium iodide is selected to be preferably in a range of from 1:5 to 1:100, more preferably in a range of from 1:6 to 1:80, especially preferably in a range of from 1:7 to 1:70.

The time of immersion of the polymer film in the dyeing bath is not particularly limited but may be selected to be preferably in a range of from 1 to 20 minutes, more preferably in a range of from 2 to 10 minutes. The temperature of the dyeing bath is selected to be preferably in a range of from 5 to 42° C., more preferably in a range of from 10 to 35° C. The polymer film may be stretched in the dyeing bath. In this step, the film is preferably stretched to have a cumulative stretching ratio up to this step of from 1.1 to 4.0.

As another method than the method of immersing the polymer film in the aforementioned dyeing bath, for example, a method of applying or spraying an aqueous solution containing a dichroic substance onto the polymer film may be used in the dyeing step. Or the dichroic substance may be mixed with the polymer film in advance when the polymer film is formed.

In the crosslinking step, the polymer film is immersed, for example, in a bath containing a crosslinking agent to thereby perform crosslinking. A heretofore known substance can be used as the crosslinking agent. Examples of the crosslinking agent include boron compounds such as boric acid, borax, etc.; glyoxal; and glutaraldehyde. One kind selected from these examples of the crosslinking agent may be used or two or more kinds selected from these examples of the crosslinking agent may be used in combination. When two or more kinds are used in combination, for example, a combination of boric acid and borax may be preferably used. On this occasion, the rate (molar ratio) of boric acid to borax is selected to be preferably in a range of from 4:6 to 9:1, more preferably in a range of from 5.5:4.5 to 7:3, most preferably just 6:4.

A solution containing the crosslinking agent dissolved in a solvent can be used as the solution in the crosslinking bath. For example, water can be used as the solvent. The solvent may contain an organic solvent mutually soluble to water. The concentration of the crosslinking agent in the solution is not limited but may be selected to be preferably in a range of from 1 to 10% by weight, more preferably in a range of from 2 to 6% by weight.

Iodide may be added into the crosslinking bath to obtain in-plane uniformity of the polarizing film. Examples of the iodide include potassium iodide, lithium iodide, sodium iodide, zinc iodide, aluminum iodide, lead iodide, copper iodide, barium iodide, calcium iodide, tin iodide, and titanium iodide. The content of the iodide is selected to be in a range of from 0.05 to 15% by weight, preferably in a range of from 0.5 to 8% by weight. Especially, a combination of boric acid and potassium iodide may be preferably used. On this occasion, the rate (weight ratio) of boric acid to potassium iodide is selected to be preferably in a range of from 1:0.1 to 1:3.5, more preferably in a range of from 1:0.5 to 1:2.5.

The temperature of the crosslinking bath is generally in a range of from 20 to 70° C. The time of immersion of the polymer film is generally in a range of from 1 second to 15 minutes, preferably in a range of from 5 seconds to 10 minutes. A method of applying or spraying a solution containing the crosslinking agent may be used in the crosslinking step in the same manner as in the dyeing step. The polymer film may be stretched in the crosslinking bath. In this step, the film is preferably stretched to have a cumulative stretching ratio up to this step of from 1.1 to 4.0.

In the stretching step, for example, when a wet stretching method is used, the polymer film is preferably stretched to have a total stretching ratio of from 2 to 7 in the condition that the polymer film is immersed in a bath.

The solution in the stretching bath is not particularly limited. For example, a solution containing any kind of metal salt or an iodine, boron or zinc compound may be used as the solution in the stretching bath. Water, ethanol or any kind of organic solvent can be used suitably as a solvent in the solution. Especially, a solution containing about 2 to 18% by weight of boric acid and/or about 2 to 18% by weight of potassium iodide is preferably used. When boric acid and potassium iodide are used in combination, the rate (weight ratio) of boric acid to potassium iodide is selected to be preferably in a range of from about 1:0.1 to 1:4, more preferably in a range of from about 1:0.5 to 1:3.

For example, the temperature of the stretching bath is preferably in a range of from 40 to 67° C., more preferably in a range of from 50 to 62° C.

In the water-washing step, the polymer film is immersed in a water-washing bath, for example, filled with an aqueous solution so that an unnecessary residue such as boric acid deposited on the polymer film in the previous step can be washed out. Iodide may be added into the aqueous solution. For example, sodium iodide or potassium iodide can be preferably used as the iodide. When potassium iodide is added into the watering-washing bath, the concentration of potassium iodide is selected to be generally in a range of from 0.1 to 10% by weight, preferably in a range of from 3 to 8% by weight. The temperature of the water-washing bath is preferably in a range of from 10 to 60° C., more preferably in a range of from 15 to 40° C. The number of cycles for repeating the water-washing step is not particularly limited. That is, the water-washing step may be repeated several times. The kind and concentration of additives in each water-washing bath may be changed in accordance with the cycle.

Incidentally, when the polymer film is pulled up from each processing bath, a conventionally known liquid-cutting roll such as a pinch roll may be used for preventing liquid dropping or superfluous water may be removed by a method of cutting liquid by an air knife.

In the drying step, any suitable method such as natural drying, air drying, heat drying, etc. can be used. Generally, heat drying is preferably used. In the heating drying, for example, it is preferable that the heating temperature is in a range of from about 20 to 80° C. and the drying time is in a range of from about 1 to 10 minutes. Furthermore, it is preferable to lower the temperature of drying so as to prevent the deterioration of a polarizing film. Therefore, the temperature of drying is preferably not higher than 60° C., more preferably not higher than 45° C.

The final stretching ratio (total stretching ratio) of the polarizing film produced by the aforementioned steps is selected to be preferably in a range of from 3.0 to 7.0, more preferably in a range of from 5.5 to 6.2. If the total stretching ratio is lower than 3.0, it is difficult to obtain a polarizing film having a high polarizing efficiency. If the total stretching ratio is higher than 7.0, the film is apt to be broken.

As long as the production method according to the present invention is used, the production of the polarizing film is not limited to the aforementioned production manner. The polarizing film may be produced in another production manner. For example, a dry stretching method may be used; a polymer film of polyethylene terephthalate (PET) or the like mixed with a dichroic substance by kneading may be formed and stretched; or an O type using a uniaxially oriented liquid crystal as a host and a dichroic dye as a guest (U.S. Pat. No. 5,523,863 and International Patent Publication No. 503322/1991) or an E type using a dichroic lyotropic liquid crystal or the like (U.S. Pat. No. 6,049,428) may be used.

The thickness of the polarizing film produced in the aforementioned manner is not particularly limited but may be selected to be preferably in a range of from 5 to 40 μm. When the thickness is not smaller than 5 μm, mechanical strength can be prevented from being reduced. When the thickness is not larger than 40 μm, optical characteristic can be prevented from being lowered. As a result, reduction in thickness can be achieved when the polarizing film is applied to an image display device.

In practical use, various kinds of optical layers may be laminated on the polarizing film according to the present invention. The optical films are not particularly limited as long as required optical characteristic can be satisfied. For example, there may be used a method in which: a transparent protective layer for protecting the polarizing film is laminated on one or each of opposite surfaces of the polarizing film; surface treatment for performing hard coating treatment, anti-reflection treatment, anti-sticking treatment or diffusing or anti-glare treatment is applied to a surface opposite to the surface of the transparent protective layer bonded to the polarizing film or one or each of opposite surfaces of the polarizing film per se; and an oriented liquid crystal layer for compensating the viewing angle or an adhesive layer for laminating another film is laminated on a surface opposite to the surface of the transparent protective layer bonded to the polarizing film or one or each of opposite surfaces of the polarizing film per se. Further, one layer of an optical film such as a polarized light conversion device, a reflector, a semi-transmissive plate, a retardation plate (inclusive of a wavelength plate (λ plate) such as a half wavelength plate or a quarter wavelength plate), a viewing angle compensating film, a brightness enhancement film, etc. used for forming an image display device may be laminated as the optical layer or two or more kinds of such optical films may be laminated as the optical layers. Particularly, a reflective polarizing plate or semi-transmissive polarizing plate including a reflector or a semitransparent reflector laminated on a polarizing plate provided as a laminate of the polarizing film and a transparent protective layer, an elliptically or circularly polarizing plate including a retardation plate laminated on the polarizing plate, a wide viewing angle polarizing plate including a viewing angle compensating layer or viewing angle compensating film laminated on the polarizing plate, or a polarizing plate including a brightness enhancement film laminated on the polarizing plate is used preferably. The optical layer or the optical film can be laminated on the transparent protective layer after or before the optical layer or the optical film is bonded to the polarizing film.

A material excellent in transparency, mechanical strength, thermal stability, moisture sealability, isotropy, etc. can be preferably used as the material for forming the transparent protective layer provided on one or each of opposite surfaces of the polarizing film. Examples of the material include: polyester polymer such as polyethylene terephthalate, polyethylene naphthalate, etc.; cellulose polymer such as diacetylcellulose, triacetylcellulose, etc.; acrylic polymer such as polymethyl methacrylate, etc.; styrene polymer such as polystyrene, acrylonitrile-styrene copolymer (AS resin), etc.; and polycarbonate polymer. Examples of the polymer material for forming the transparent protective layer further include: polyolefin polymer such as polyethylene, polypropylene, polyolefin having a cyclo or norbornene structure, ethylene-propylene copolymer, etc.; vinyl chloride polymer; amide polymer such as Nylon, aromatic polyamide, etc.; imide polymer; sulfone polymer; polyether-sulfone polymer; polyether-ether-ketone polymer; polyphenylene sulfide polymer; vinyl alcohol polymer; vinylidene chloride polymer; vinyl butyral polymer; allylate polymer; polyoxymethylene polymer; epoxy polymer; and blends of these polymers. The transparent protective layer may be formed as a cured layer of a heat-curable or ultraviolet-curable resin such as an arylic resin, an urethane resin, an acryl-urethane resin, an epoxy resin, a silicone resin, etc. Especially, a triacetylcellulose film having a surface saponified by alkali or the like may be preferably used as the transparent protective layer to be bonded to the polarizing film according to the present invention.

A polymer film described in JP A 2001-343529 (WO 01/37007), for example, made of a resin composition containing (A) a thermoplastic resin having a, substituent and/or non-substituent imide group as its side chain, and (B) a thermoplastic resin having substituent and/or non-substituent phenyl and nitrile groups as its side chain can be used as the transparent protective layer. A specific example is a film made of a resin composition containing an alternate copolymer of an isobutene-N-methyl maleimide, and an acrylonitrile-styrene copolymer. A film made from a mixture extruded product of a resin composition can be used as the film.

The thickness of the transparent protective layer is not particularly limited but may be generally selected to be not larger than 500 μm, preferably in a range of from 1 to 300 μm, especially preferably in a range of from 5 to 200 μm. It is preferable from the point of view of improvement in polarizing characteristic, durability and bonding characteristic that a surface of the transparent protective layer is saponified by alkali or the like.

It is preferable that the transparent protective layer is as colorless as possible. Therefore, a transparent protective layer in which the value Rth of retardation (phase retardation) in the direction of the thickness of the film as represented by $Rth=[(nx+ny)/2-nz]\cdot d$ (in which nx and ny are main refractive indices in a plane of the film, nz is a refractive index in the direction of the thickness of the film, and d is the thickness of the film) is in a range of from −90 nm to +75 nm is used preferably. When such a transparent protective layer is used, coloring (optical coloring) of the polarizing plate caused by the transparent protective layer can be almost eliminated. Rth is selected to be more preferably in a range of from −80 nm to +60 nm, especially preferably in a range of from −70 nm to +45 nm.

When the transparent protective layer is laminated on each of opposite surfaces of the polarizing film, the characteristic of the transparent protective layer may vary according to each surface. The characteristic of the transparent protective layer is not limited but examples of the characteristic include thickness, material, light transmittance, tensile modulus of elasticity, and the presence/absence of any optical layer.

The hard coating treatment is provided for preventing the surface of the polarizing film or the polarizing plate as a laminate of the polarizing film and the transparent protective layer from being injured. For example, the hard coating treatment can be made by a method in which a cured film made from a suitable ultraviolet-curable resin such as an acrylic resin or a silicone resin and excellent in hardness, slip characteristic, etc. is applied on a surface of the transparent protective layer. The anti-reflection treatment is provided for preventing external light from being reflected on a surface of the polarizing plate. For example, the anti-reflection treatment can be achieved in such a manner that an anti-reflection film according to the background art is formed. The anti-sticking treatment is provided for preventing the polarizing plate from being stuck closely to an adjacent layer.

The anti-glare treatment is provided for preventing visual recognition of light transmitted through the polarizing plate from being disturbed by external light reflected on a surface of the polarizing plate. For example, the anti-glare treatment can be made in such a manner that a fine roughness structure is given to a surface of the transparent protective layer by a suitable method such as a surface roughening method using sandblasting or embossing or a method of mixing transparent fine particles. For example, transparent fine particles having a mean particle size of from 0.5 to 50 μm can be used as the fine particles contained for forming the fine roughness structure on the surface of the transparent protective layer. Examples of the transparent fine particles include: inorganic fine particles which are made of silica, alumina, titania, zirconia, tin oxide, indium oxide, cadmium oxide, antimony oxide, etc. and which may be electrically conductive; and organic fine particles made of a crosslinked or non-crosslinked polymer. The amount of the fine particles used for forming the surface fine roughness structure is selected to be generally in a range of from about 2 to 70 parts by weight, preferably in a range of from 5 to 50 parts by weight with respect to 100 parts by weight of the transparent resin used for forming the surface fine roughness structure. The anti-glare layer may serve as a diffusing layer (having a viewing angle widening function, etc.) for diffusing light transmitted through the polarizing plate to thereby widen the viewing angle.

Incidentally, the optical layers such as the anti-reflection layer, the anti-sticking layer, the diffusing layer and the anti-glare layer may be provided on the transparent protective layer per se or may be provided separately from the transparent protective layer.

When the polarizing film and the transparent protective layer are bonded to each other through an adhesive layer, the bonding process is not particularly limited. For example, the bonding process can be made through an adhesive made of a vinyl polymer or through an adhesive at least containing boric acid or borax, glutaraldehyde or melamine, and a water soluble crosslinking agent of a vinyl alcohol polymer of oxalic acid or the like. The adhesive layer can be formed as a layer formed by application of an aqueous solution and dried. When the aqueous solution is prepared, other additives or a catalyst such as acid may be mixed with the aqueous solution if necessary. Particularly when a polyvinyl alcohol polymer film is used as the polarizing film, it is preferable from the point of view of bonding characteristic that an adhesive of polyvinyl alcohol is used.

The reflective polarizing plate has a polarizing plate, and a reflection layer provided on the polarizing plate. The reflective polarizing plate is provided for forming a liquid crystal display of the type of reflecting light given from the visual side (display side) and using the reflected light for display. The reflective polarizing plate has an advantage in that reduction in thickness and size of the liquid crystal display can be attained easily because a built-in light source such as a backlight unit can be dispensed with. The reflective polarizing plate can be formed by a suitable method such as a method of applying a reflection layer made of a metal or the like on a single surface of a polarizing plate through a transparent protective layer if necessary.

A specific example of the reflective polarizing plate is a reflective polarizing plate having a reflection layer formed in such a manner that a sheet of foil or a deposition film made of a reflective metal such as aluminum is applied on a single surface of a transparent protective layer matted if necessary. Another specific example is a reflective polarizing plate having a reflection layer of a fine roughness structure formed on a surface fine roughness structure formed in such a manner that the transparent protective layer is made to contain fine particles. The reflection layer of the fine roughness structure has an advantage in that incident light is scattered by irregular reflection to prevent directivity and glaring looks and suppress unevenness in bright and darkness. The transparent protective layer containing fine particles has an advantage in that incident light and reflected light thereof are diffused when transmitted through the transparent protective layer to thereby suppress unevenness in bright and darkness more sufficiently. The reflection layer of the fine roughness structure formed by reflecting the surface fine roughness structure of the transparent protective layer can be formed in such a manner that a metal is directly applied on a surface of the transparent protective layer by a suitable method such as a vapor deposition method or a plating method. Specific examples of the method include a vacuum vapor deposition method, an ion-plating method, and a sputtering method.

The reflector may be used as a reflection sheet having a suitable film according to the transparent film, and a reflection layer provided on the suitable film, in place of the method of directly applying the reflector on the transparent protective layer of the polarizing plate. Incidentally, because the reflection layer is generally made of a metal, it is preferable that the reflection layer is used in the condition that the reflection surface of the reflection layer is coated with a transparent protective layer, a polarizing plate, etc. in order to prevent reduction in reflectance caused by oxidation, keep initial reflectance for a long term and avoid provision of any special protective layer.

Incidentally, the semi-transmissive polarizing plate can be obtained in such a manner that the aforementioned reflection layer is provided as a semi-transmissive reflection layer such as a half mirror capable of reflecting part of light and transmitting the other part of light. The semi-transmissive polarizing plate is generally provided on the rear side of a liquid crystal cell to form a liquid crystal display of the type in which light given from the visual side (display side) is reflected to display an image when the liquid crystal display is used in a relatively bright condition and in which a built-in light source such as a backlight unit provided on the rear side of the semi-transmissive polarizing plate is used to display an image when the liquid crystal display is used in a relatively dark condition. That is, the semi-transmissive polarizing plate is useful for forming a liquid crystal display of the type in which energy spent by a light source such as a backlight unit can be saved in a bright condition and in which the built-in light source can be used even in a relatively bright condition.

The elliptically or circularly polarizing plate as a laminate of the polarizing plate and a retardation plate will be described below. A retardation plate or the like is used for converting linearly polarized light into elliptically or circularly polarized light, converting elliptically or circularly polarized light into linearly polarized light or changing the direction of polarization of linearly polarized light. Particularly, a so-called quarter wavelength plate (also called $\lambda/4$ plate) is used as a retardation plate for converting linearly polarized light into circularly polarized light or converting circularly polarized light into linearly polarized light. A half wavelength plate (also called $\lambda/2$ plate) is generally used for changing the direction of polarization of linearly polarized light.

The elliptically polarizing plate is used effectively for compensating (preventing) coloring (blue or yellow) caused by the birefringence of a liquid crystal layer of a super-twisted nematic (STN) liquid crystal display to achieve monochrome display free from the coloring. Moreover, when three-dimensional refractive indices are controlled, coloring generated in oblique view of the display screen of the liquid crystal display can be compensated (prevented), preferably. The circularly polarizing plate is used effectively, for example, for adjusting the color tone of an image on a reflective liquid crystal display of a color image display type. The circularly polarizing plate also has an anti-reflection function.

Examples of the retardation plate include: a birefringence film formed by uniaxially or biaxially stretching a high-molecular material; an oriented film formed by crosslinking and polymerization after orienting a liquid crystal monomer; an oriented film of a liquid crystal polymer; and a film having an oriented layer of a liquid crystal polymer supported by the film. The stretching process can be made, for example, by a roll stretching method, a long gap alignment stretching method, a tenter stretching method, a tubular stretching method, etc. The stretching ratio is generally in a range of from about 1.1 to 3 in the case of uniaxial stretching. The thickness of the retardation plate is not particularly limited but may be selected to be generally in a range of from 10 to 200 µm, preferably in a range of from 20 to 100 µm.

Examples of the high-molecular material include polyvinyl alcohol, polyvinyl butyral, polymethyl vinyl ether, polyhydroxyethyl acrylate, hydroxyethyl cellulose, hydroxypropyl cellulose, methyl cellulose, polycarbonate, polyallylate, polysulfone, polyethylene terephthalate, polyethylene naphthalate, polyether-sulfone, polyphenylene sulfide, polyphenylene oxide, polyacryl sulfone, polyvinyl alcohol, polyamide, polyimide, polyolefin, polyvinyl chloride, cellulose polymer, various binary or ternary copolymers of these, graft copolymer, and blends of these. The high-molecular material is changed to an oriented substance (stretched film) by stretching or the like.

Either lyotropic liquid crystal monomer or thermotropic liquid crystal monomer can be used as the liquid crystal monomer. From the point of view of production efficiency, thermotropic liquid crystal monomer is preferred. For example, a monomer having a compound such as a biphenyl derivative, a phenyl benzoate derivative or a stilbene derivative as a basic skeleton, and a functional group such as an acryloyl group, a vinyl group or an epoxy group introduced into the compound may be preferably used as the thermotropic liquid crystal monomer. For example, the following method is applied to such a liquid crystal monomer. That is, the liquid crystal monomer is oriented by a commonly known method such as a method using heat or light, a method of rubbing a surface of a substrate or a method of adding an orientation assisting agent. Then, while the orientation is kept, the liquid crystal monomer is crosslinked and polymerized by light, heat or electron beam irradiation to thereby fix the orientation.

Examples of the liquid crystal polymer include various kinds of main-chain or side-chain polymers having conjugate linear atom groups (mesogen groups) introduced into their main chains or side chains for donating liquid crystal orienting characteristic. Specific examples of the main-chain liquid crystal polymer include polymers each having such a structure that a mesogen group is connected by a spacer portion for donating flexing characteristic, that is, a nematic oriented polyester liquid crystal polyester, a discotic polymer, and a cholesteric polymer. Specific examples of the side-chain liquid crystal polymer include polymers each of which has polysiloxane; polyacrylate, polymethacrylate or polymalonate as a main chain skeleton, and a mesogen portion of a nematic orientation-donating para-substitutional cyclic compound unit through a spacer portion of conjugate atom groups as a side chain. Each of these liquid crystal polymers can be produced, for example, by a method in which a liquid crystal polymer solution is spread on a rubbed surface of a thin film of polyimide, polyvinyl alcohol or the like formed on a glass plate or on an oriented surface of obliquely deposited silicon oxide and then heated.

The retardation plate can have a suitable retardation according to the purpose of use such as the purpose of compensating for coloring caused by the birefringence of various kinds of wavelength plates and liquid crystal layers, the viewing angle, and so on. The retardation plate may be made of a laminate of at least two kinds of retardation plates in order to control optical characteristic such as retardation.

The elliptically polarizing plate or reflective elliptically polarizing plate is provided as a laminate using a suitable combination of at least one polarizing plate or reflective polarizing plate and at least one retardation plate. The (reflective) elliptically polarizing plate may be formed in such a manner that at least one (reflective) polarizing plate and at least one retardation plate are laminated successively and separately in the process of production of a liquid crystal display so that the (reflective) polarizing plate and the retardation plate can be combined with each other. Or the elliptically polarizing plate etc. may be provided as an optical film in advance as described above. The elliptically polarizing plate etc. provided as an optical film is excellent in stability of quality and efficiency in laminating work, so that there is an advantage in that efficiency in production of a liquid crystal display or the like can be improved.

The viewing angle compensating film is provided for widening the viewing angle so that an image can be seen relatively sharply even in the case where a display screen of a liquid crystal display is viewed not perpendicularly but slightly obliquely. Examples of the viewing angle compensating film include: a retardation plate; an oriented film of a liquid crystal polymer; and a transparent substrate having an oriented layer of a liquid crystal polymer supported thereon. Although the general retardation plate is made of a polymer film uniaxially stretched in an in-plane direction so as to have birefringence, the retardation plate used as the viewing angle compensating film is made of a polymer film biaxially stretched in an in-plane direction so as to have birefringence or a bidirectionally stretched film such as a polymer film or a gradient oriented film uniaxially stretched in an in-plane direction and further stretched in a direction of thickness so as to have birefringence with the refractive index controlled in the direction of thickness. Examples of the gradient oriented film include: a polymer film stretched and/or shrunk under action of shrinking force of a heat-shrinkable film due to heating after the heat-shrinkable film is bonded to the polymer film; and a film of a liquid crystal polymer oriented obliquely. Polymers the same as the polymers listed above in the description of the retardation plate can be used as materials for forming the retardation plate used as the viewing angle compensating film. A suitable polymer can be selected from the point of view of prevention of coloring caused by change in viewing angle based on the retardation in a liquid crystal cell and enlargement of the viewing angle with good visibility.

To achieve a wide viewing angle with good visibility, there can be preferably used an optically compensating retardation plate which is formed in such a manner that an optically anisotropic layer made of an oriented layer of a liquid crystal polymer, especially made of an obliquely oriented film of a discotic liquid crystal polymer, is supported by a triacetyl cellulose film.

Examples of the polarized light conversion device include an anisotropic reflective polarizing device, and an anisotropic scattering polarizing device. Examples of the material preferably used as the anisotropic reflective polarizing element include: a composite of a material, such as a cholesteric liquid crystal layer, especially an oriented film of a cholesteric liquid crystal polymer or a film substrate having the oriented liquid crystal layer supported thereon, exhibiting characteristic of reflecting either left-handed or right-handed circularly polarized light but transmitting the other part of light and a retardation plate having a retardation 0.25 times as large as any wavelength in the reflection band; and a material, such as a multilayer thin film of dielectric or a multilayer laminate of thin films different in refractive index anisotropy, exhibiting characteristic of transmitting linearly polarized light with a predetermined polarization axis but reflecting the other part of light. Examples of the former are PCF series made by Nitto Denko Corp. Examples of the latter are DBEF series made by 3M Company. A reflective grid polarizer may be preferably used as the anisotropic reflective polarizing element. An example of the reflective grid polarizer is Micro Wires made by Moxtek, Inc. on the other hand, an example of the anisotropic scattering polarizing element is DRPF made by 3M Company.

The polarizing plate provided as a laminate of a polarizing plate and a brightness enhancement film is generally used in a state in which it is provided on the rear side of a liquid crystal cell. The brightness enhancement film exhibits characteristic of reflecting part of light such as linearly polarized light with a predetermined polarization axis or circularly polarized light with a predetermined direction but transmitting the other part of light when natural light is incident on the brightness enhancement film from a backlight unit of a liquid crystal display or by reflection in the rear side. The polarizing plate provided as a laminate of a polarizing plate and a brightness enhancement film is provided so that part of light having a predetermined polarized state is transmitted and the other part of light not having the predetermined polarized state is not transmitted but reflected when light emitted from a light source such as a backlight unit is incident on the polarizing plate. Light reflected by a surface of the brightness enhancement film may be returned by a reflection layer provided on the rear side of the brightness enhancement film so that the light can be made incident on the brightness enhancement film again. As a result, the light can be partially or wholly transmitted as light having the predetermined polarized state to attain increase in the amount of light transmitted through the brightness enhancement film. Moreover, polarized light incapable of being absorbed to the polarizing film can be supplied to attain increase in the amount of light allowed to be used for liquid crystal display. In this manner, luminance can be improved. That is, if light emitted from a backlight unit on the rear side of a liquid crystal cell is made incident on the polarizing film without use of any brightness enhancement film, the light can be little transmitted through the polarizing film because a large part of light having a direction of polarization not coincident with the polarization axis of the polarizing film is absorbed to the polarizing film. That is, though the amount of transmitted light varies according to the characteristic of the polarizing film used, about 50% of light is generally absorbed to the polarizing film to decrease the amount of light allowed to be used for liquid crystal display to thereby darken an image. The brightness enhancement film does not transmit light having a direction of polarization which will be absorbed to the polarizing film, that is, the brightness enhancement film once reflects such light. The reflected light is returned by a reflection layer provided on the rear side of the brightness enhancement film so that the light can be made incident on the brightness enhancement film again. While this operation is repeated, the direction of polarization of light reflected and returned between the brightness enhancement film and the reflection layer can be changed to allow the light to be transmitted through the polarizer. Only polarized light having the direction of polarization changed in this manner is supplied to the polarizing film. Accordingly, light emitted from a backlight unit or the like can be efficiently used for image display on a liquid crystal display, so that the screen of the liquid crystal display can be made bright.

A diffusing plate may be provided between the brightness enhancement film and the reflection layer. Light of a polarized state reflected by the brightness enhancement film advances toward the reflection layer. The diffusing plate provided between the brightness enhancement film and the reflection layer diffuses evenly light transmitted through the diffusing plate while eliminating the polarized state to a non-polarized state. That is, the polarized state is restored to a natural light state. The light of the non-polarized state, that is, the natural light state advances toward the reflection layer and is reflected by the reflection layer. The reflected light is transmitted through the diffusing plate again, so that the light is made incident on the brightness enhancement film again. This operation is repeated. When the diffusing plate for restoring the polarized state to its original natural light state is provided as described above, unevenness of brightness of the display screen can be reduced while brightness of the display screen can be retained so that a screen of uniform brightness can be provided. It is conceived that a display screen of uniform brightness can be provided because of moderate increase in the number of repetitions in reflection of initial incident light in addition to the diffusing function of the diffusing plate when the diffusing plate for restoring the polarized state to its original natural light state is provided.

Examples of the brightness enhancement film that can be used suitably include: a film exhibiting characteristic of transmitting linearly polarized light having a predetermined polarization axis but reflecting the other part of light, such as a multilayer dielectric thin film or a multilayer laminate of thin films different in refractive index anisotropy; and a film exhibiting characteristic of reflecting either left-handed circularly polarized light or right-handed circularly polarized light but transmitting the other part of light, such as an oriented film of a cholesteric liquid crystal polymer or a film substrate having an oriented liquid crystal layer of a cholesteric liquid crystal polymer supported thereon.

Accordingly, in a brightness enhancement film of the type of transmitting linearly polarized light having a predetermined polarization axis, when light transmitted through the brightness enhancement film is made incident on the polarizing plate with the polarization axis kept constant as it is, the light can be efficiently transmitted through the polarizing plate while absorption loss due to the polarizing plate is suppressed. On the other hand, in a brightness enhancement film of the type of transmitting circularly polarized light in the same manner as in a cholesteric liquid crystal layer, light transmitted through the brightness enhancement film may be made directly incident on the polarizing film, but it is preferable from the point of view of suppression of absorption loss that the circularly polarized light is converted into linearly polarized light by a retardation plate so that the linearly polarized light can be made incident on the polarizing plate. Incidentally, when a quarter wavelength plate is used as the retardation plate, circularly polarized light can be converted into linearly polarized light.

A retardation plate functioning as a quarter wavelength plate in a wide wavelength range such as a visible light wavelength range can be obtained by a method of laminating a phase retarder layer functioning as a quarter wavelength plate, for example, for monochromatic light with a wavelength of 550 nm and a phase retarder layer exhibiting another phase retarding characteristic such as a phase retarder layer functioning as a half wavelength plate. Therefore, the retardation plate disposed between the polarizing plate and the brightness enhancement film may contain one phase retarder layer or two or more phase retarder layers.

Incidentally, when the cholesteric liquid crystal layer is formed as an arrangement structure in which two layers or three or more layers different in reflection wavelength are laminated in combination, the cholesteric liquid crystal layer can be obtained as a layer reflecting circularly polarized light in a wide wavelength range such as a visible light wavelength range. As a result, circularly polarized light transmitted through the cholesteric liquid crystal layer in a wide wavelength range can be obtained.

In the present invention, the polarizing plate may be formed as a laminate of a polarizing plate and two or three or more optical layers in the same manner as in the polarized light separating type polarizing plate. Therefore, the polarizing plate may be a reflective elliptically polarizing plate or semi-transmissive elliptically polarizing plate formed by combination of the reflective polarizing plate or semi-transmissive polarizing plate and the retardation plate.

Although an optical film, which is a laminate of the polarizing plate and the optical layers, can be also formed by a method of laminating the optical layers successively and separately in the process of production of a liquid crystal display or the like, an optical film formed by lamination in advance is excellent in stability of quality, efficiency in assembling work, and so on, and brings an advantage in that the process of production of a liquid crystal display or the like can be improved. Suitable bonding means such as an pressure sensitive adhesive layer can be used for lamination. When the polarizing plate and another optical layer are bonded to each other, the optical axes thereof can be disposed to form a suitable angle in accordance with aimed phase retarding characteristic.

An pressure sensitive adhesive layer can be provided on the polarizing film or laminated optical member in the present invention so that the polarizing film or laminated optical member can be bonded to another member such as a liquid crystal cell by the pressure sensitive adhesive layer. The pressure sensitive adhesive layer is not particularly limited. For example, the pressure sensitive adhesive layer can be made of a suitable pressure sensitive adhesive such as an acrylic pressure sensitive adhesive, a silicone pressure sensitive adhesive, a polyester pressure sensitive adhesive, a polyurethane pressure sensitive adhesive, a polyether pressure sensitive adhesive, a rubber pressure sensitive adhesive, etc. according to the background art. From the point of view of prevention of a foaming phenomenon and a peeling phenomenon due to moisture absorption, prevention of lowering of optical characteristic and warping of a liquid crystal cell due to difference between thermal expansion coefficients, formability of an image display device excellent in quality and durability, and so on, it is preferable that the pressure sensitive adhesive layer is low in coefficient of moisture absorption and excellent in heat resistance. From the point of view of prevention of change in optical characteristic of the polarizing film or the like, an pressure sensitive adhesive neither requiring any high-temperature process for curing and drying nor requiring any long time for curing and drying is used preferably. From this point of view, an acrylic pressure sensitive adhesive is preferably used in the present invention.

The pressure sensitive adhesive layer may contain fine particles so as to exhibit light-diffusing characteristic. The pressure sensitive adhesive layer may be provided on a necessary surface as occasion demands. For example, referring to the polarizing plate composed of a polarizing film and at least one transparent protective film in the present invention, the pressure sensitive adhesive layer may be provided on one or each of opposite surfaces of the protective layer as occasion demands.

The thickness of the pressure sensitive adhesive is not particularly limited but is generally selected to be preferably in a range of from 5 to 35 μm, more preferably in a range of from 15 to 25 μm. When the thickness of the pressure sensitive adhesive layer is selected to be in this range, stress caused by the size behavior of the polarizing film and the polarizing plate can be relaxed.

When the pressure sensitive adhesive layer is exposed, the pressure sensitive adhesive layer may be preferably temporarily covered with a separator for the purpose of preventing contamination until the pressure sensitive adhesive layer is put into practical use. The separator can be formed by a method in which a releasing coat of a suitable releasing agent such as a silicone releasing agent, a long-chain alkyl releasing agent, a fluorine releasing agent or molybdenum sulfide is provided on a suitable film according to the transparent protective film as occasion demands.

Incidentally, each of layers such as a transparent protective layer, an optical layer and an pressure sensitive adhesive layer for forming the polarizing plate and the optical member may be given ultraviolet-absorbing power by a suitable method such as a method of treating the layer with an ultraviolet-absorbing agent such as a salicylic ester compound, a benzophenone compound, a benzotriazole compound, a cyanoacrylate compound or a nickel complex salt compound.

The polarizing film according to the present invention can be preferably used for forming an image display device such as a liquid crystal display, an electroluminescence (EL) display, a plasma display (PD), a field emission display (FED), etc.

The polarizing film according to the present invention can be preferably used for forming various kinds of devices such as a liquid crystal display. For example, the polarizing film can be used in a reflective or semi-transmissive liquid crystal display or a transmissive-reflective-type liquid crystal display in which the polarizing film or polarizing plate is disposed on one or each of opposite surfaces of a liquid crystal cell. A substrate for the liquid crystal cell may be a plastic substrate or a glass substrate. The liquid crystal cell used for forming the liquid crystal display can be selected optionally. For example, there may be used any suitable type of liquid crystal cell such as an active matrix drive type liquid crystal cell represented by a thin-film transistor type liquid crystal cell or a passive matrix drive type liquid crystal cell represented by a twisted nematic liquid crystal cell or a super-twisted nematic liquid crystal cell.

When polarizing plates or optical members are provided on opposite surfaces of the liquid crystal cell respectively, the polarizing plates or optical members may be the same or may be different. For formation of the liquid crystal display, one or two or more layers of suitable parts such as a prism array sheet, a lens array sheet, a light-diffusing plate and a backlight unit may be disposed in a suitable position or positions.

Next, an organic electroluminescence device (organic EL display device) will be described. Generally, in the organic EL display device, a transparent electrode, an organic light-emitting layer and a metal electrode are laminated successively on a transparent substrate to thereby form an emitter (organic electroluminescence emitter). The organic light-emitting layer is provided as a laminate of various organic thin films. For example, there are known configurations of various combinations such as a laminate of a hole injection layer made of a triphenylamine derivative or the like and a luminous layer made of an organic fluorescent solid substance such as anthracene, a laminate of the luminous layer and an electron injection layer made of a perylene derivative or the like, and a laminate of the hole injection layer, the luminous layer and the electron injection layer.

The organic EL display device emits light on the basis of the following principle. When a voltage is applied between the transparent electrode and the metal electrode, holes and electrons are injected into the organic light-emitting layer. In the organic light-emitting layer, these holes and electrons are recombined to generate energy for exciting the fluorescent substance. When the excited fluorescent substance is restored to its ground state, light is radiated from the fluorescent substance. The mechanism of hole-electron recombination in the middle of the aforementioned principle is the same as that of a general diode. As expected from this fact, both electric current and luminous intensity exhibit strong nonlinearity resulting from rectifiability with respect to the applied voltage.

In the organic EL display device, at least one electrode must be transparent to take out light emitted from the organic light-emitting layer. Generally, a transparent electrode made of a transparent electrical conductor such as indium tin oxide (ITO) is used as an anode. On the other hard, it is important that a substance small in work function is used as a cathode to make electron injection easy to improve luminous efficiency. Generally, a metal electrode made of Mg—Ag, Al—Li or the like is used as the cathode.

In the organic EL display device configured as described above, the organic light-emitting layer is formed as a very thin film about 10 nm thick. For this reason, the organic light-emitting layer transmits light approximately perfectly like the transparent electrode. As a result, light incident on a surface of the transparent substrate, transmitted through both the transparent electrode and the organic light-emitting layer and reflected by the metal electrode at the time of non-emitting operation comes to the surface side of the transparent substrate again. Accordingly, when viewed from the outside, a display surface of the organic EL display device looks like a mirror surface.

In an organic EL display device including an organic electroluminescence emitter having an organic light-emitting layer for emitting light by application of a voltage, a transparent electrode provided on a front surface side of the organic light-emitting layer, and a metal electrode provided on a rear surface side of the organic light-emitting layer, a polarizing plate may be provided on the front surface side of the transparent electrode and a retardation film may be provided between the transparent electrode and the polarizing plate.

The retardation film and the polarizing film have a function of polarizing light which comes from the outside and which is reflected by the metal electrode. The polarizing function is effective in preventing the mirror surface of the metal electrode from being visually recognized from the outside. Particularly when the retardation film is constituted by a quarter wavelength plate while the angle between the polarizing plate and the retardation film in terms of direction of polarization is adjusted to $\pi/4$, the mirror surface of the metal electrode can be shaded perfectly.

That is, only a linearly polarized light component of external light incident on the organic EL display device is transmitted through the polarizing plate. Generally, the linearly polarized light is converted into elliptically polarized light by the retardation film. Particularly when the retardation film is constituted by a quarter wavelength plate while the angle between the polarizing plate and the retardation film in terms of direction of polarization is adjusted to $\pi/4$, the linearly polarized light is converted into circularly polarized light by the retardation film.

The circularly polarized light is transmitted through the transparent substrate, the transparent electrode and the organic thin film and then reflected by the metal electrode. The reflected light is transmitted through the organic thin film, the transparent electrode and the transparent substrate again and converted into linearly polarized light by the retardation film again. The linearly polarized light cannot be transmitted through the polarizing plate because it is perpendicular to the direction of polarization of the polarizing plate. As a result, the mirror surface of the metal electrode can be shaded perfectly.

In the PD, electric discharge is generated in rare gas enclosed in a panel, especially gas mainly containing neon. Vacuum ultraviolet light caused by the electric discharge excites fluorescent substances of R, G and B applied on the cell of the panel. As a result, the fluorescent substances generate fluorescence of R, G and B so that an image can be displayed.

In the field of the image display device, in-house production is required for continuously executing the steps of punching pieces in a raw optical film, screening the pieces and bonding the pieces for the sake of reduction in cost. In the in-house production method for performing continuous production from the step of after-treating (cutting) an optical film to the step of bonding the optical film to a cell, it is necessary to measure the failure area immediately. In the present invention, when a cut polarizing plate is used in a display as it is, each of a vertical size and a horizontal size of the chip-cut polarizing film is optional but is generally selected to be in a range of from 10 cm to 130 cm. The upper limit of the size of the display is not set but depends on the width of a base material for a transparent protective film and a polarizing film such as a PVA film that can be produced actually. Accordingly, in the related art, an inspection step is required after the chip cutting step, so that defective products are removed in the inspection step. In the present invention, however, the process for bonding the polarizing film to an image display device such as a liquid crystal display or an EL display device can be executed in one line without interposition of the inspection step after the chip cutting step and without interposition of the carrying, packing and unpacking steps necessary for the inspection step because the in-plane uniformity of the polarizing film is high.

The present invention provides a polarizing film high in the orientation degree and uniform in in-plane optical characteristic because the rate (L/W) of the stretching distance (L) in the stretching process to the width of initial raw film (W) is selected to be in a range from 0.5 to 30, both inclusively, in a method for producing the polarizing film. The present invention also provides an optical film as a laminate of the polarizing film and any kind of optical layer, and an image display device using the polarizing film or the optical film.

EXAMPLES

The present invention is now illustrated in greater detail with reference to Examples and comparative Examples, but it should be understood that the present invention is not to be construed as being limited thereto.

Example 1

A polyvinyl alcohol (PVA) film (manufactured by Kuraray Co., Ltd., polymerization degree: 2400) having a thickness of 75 µm and an width of initial raw film of 100 mm was used for producing a 28 µm-thick polarizing film through the steps of swelling, dyeing, crosslinking, stretching, water-washing and drying. In each step described above, a film is transported by rolls as shown in FIG. 1 and FIG. 2, and stretching is performed by making use of the differential of rotation speed of the pinch rollers disposed in front of and in rear of each step.

The conditions in the respective steps were as follows.

(Swelling Step)

The film was stretched to 2.5 times (at a stretching distance of 60 mm) in pure water at 30° C.

(Dyeing Step)

The film was stretched to have a cumulative stretching ratio up to this step of 2.8 (at a stretching distance of 60 mm) while dyed for 60 seconds in an aqueous solution containing 0.05% by weight of iodine (I/KI (weight ratio)=1/10) at 30° C.

(Crosslinking Step)

The film was stretched to have a cumulative stretching ratio up to this step of 3.0 (at a stretching distance of 60 mm) while immersed for 30 seconds in an aqueous solution (40° C.) containing 3% by weight of boric acid, and 2% by weight of KI.

(Stretching Step)

The film was stretched to have a total stretching ratio of 5.8 (at a stretching distance of 60 mm) in an aqueous solution (60° C.) containing 4% by weight of boric acid, and 3% by weight of KI.

(Water-Washing Step)

The film was immersed for 30 seconds in an aqueous solution (25° C.) containing 5% by weight of KI.

(Drying Step)

The film was dried at 40° C. for 1 minute while tension was kept.

The single transmittance and crossed transmittance of the obtained polarizing film, the polarizing efficiency of the polarizing film and the standard deviation of the crossed transmittance in the widthwise direction at a measurement wavelength of 440 nm were measured. Results of the measurement were as shown in Table 1.

Example 2

A polarizing film was obtained in the same manner as in Example 1 except that the stretching distance in each of the swelling, dyeing, crosslinking and stretching steps in Example 1 was changed to 100 mm. The single transmittance and crossed transmittance of the obtained polarizing film, the polarizing efficiency of the polarizing film and the standard deviation of the crossed transmittance in the widthwise direction at a measurement wavelength of 440 nm were measured. Results of the measurement were as shown in Table 1.

Example 3

A polarizing film was obtained in the same manner as in Example 1 except that the stretching distance in each of the swelling, dyeing, crosslinking and stretching steps in Example 1 was changed to 200 mm. The single transmittance and crossed transmittance of the obtained polarizing film, the polarizing efficiency of the polarizing film and the standard deviation of the crossed transmittance in the widthwise direction at a measurement wavelength of 440 nm were measured. Results of the measurement were as shown in Table 1.

Example 4

A polarizing film was obtained in the same manner as in Example 1 except that the stretching distance in each of the swelling, dyeing, crosslinking and stretching steps in Example 1 was changed to 300 mm. The single transmittance and crossed transmittance of the obtained polarizing film, the polarizing efficiency of the polarizing film and the standard deviation of the crossed transmittance in the widthwise direction at a measurement wavelength of 440 nm were measured. Results of the measurement were as shown in Table 1.

Example 5

A polarizing film was obtained in the same manner as in Example 1 except that the stretching distance in each of the swelling, dyeing, crosslinking and stretching steps in Example 1 was changed to 450 mm. The single transmittance and crossed transmittance of the obtained polarizing film, the polarizing efficiency of the polarizing film and the standard deviation of the crossed transmittance in the widthwise direction at a measurement wavelength of 440 nm were measured. Results of the measurement were as shown in Table 1.

Example 6

A polarizing film was obtained in the same manner as in Example 1 except that the stretching distance in each of the swelling, dyeing, crosslinking and stretching steps in Example 1 was changed to 600 mm. The single transmittance and crossed transmittance of the obtained polarizing film, the polarizing efficiency of the polarizing film and the standard deviation of the crossed transmittance in the widthwise direction at a measurement wavelength of 440 nm were measured. Results of the measurement were as shown in Table 1.

Example 7

A polarizing film was obtained in the same manner as in Example 1 except that the stretching distance in each of the swelling, dyeing, crosslinking and stretching steps in Example 1 was changed to 800 mm. The single transmittance and crossed transmittance of the obtained polarizing film, the polarizing efficiency of the polarizing film and the standard deviation of the crossed transmittance in the widthwise direction at a measurement wavelength of 440 nm were measured. Results of the measurement were as shown in Table 1.

Example 8

A polarizing film was obtained in the same manner as in Example 1 except that the stretching distance in each of the swelling, dyeing, crosslinking and stretching steps in Example 1 was changed to 1000 mm. The single transmittance and crossed transmittance of the obtained polarizing film, the polarizing efficiency of the polarizing film and the standard deviation of the crossed transmittance in the widthwise direction at a measurement wavelength of 440 nm were measured. Results of the measurement were as shown in Table 1.

Example 9

A polarizing film was obtained in the same manner as in Example 1 except that a PVA film (made by Kuraray Co., Ltd., polymerization degree; 2400) having an width of initial raw film of 1200 mm was used and that the stretching distance in each of the swelling, dyeing, crosslinking and stretching steps was changed to 4500 mm. The single transmittance and crossed transmittance of the obtained polarizing film, the polarizing efficiency of the polarizing film and the standard deviation of the crossed transmittance in the widthwise direction at a measurement wavelength of 440 nm were measured. Results of the measurement were as shown in Table 1.

Example 10

A polarizing film was obtained in the same manner as in Example 1 except that a PVA film (made by Kuraray Co., Ltd., polymerization degree: 2400) having an width of initial raw film of 2300 mm was used and that the stretching distance in each of the swelling, dyeing, crosslinking and stretching steps was changed to 4500 mm. The single transmittance and crossed transmittance of the obtained polarizing film, the polarizing efficiency of the polarizing film and the standard deviation of the crossed transmittance in the widthwise direction at a measurement wavelength of 440 nm were measured. Results of the measurement were as shown in Table 1.

Example 11

A polarizing film was obtained in the same manner as in Example 1 except that a PVA film (made by Kuraray Co., Ltd., polymerization degree: 2400) having an width of initial raw film of 1200 mm was used and that the stretching distance in each of the swelling and dyeing steps was changed to 1800 mm, the stretching distance in the crosslinking step was changed to 600 mm and the stretching distance in the stretching step was changed to 2400 mm. The single transmittance and crossed transmittance of the obtained polarizing film, the polarizing efficiency of the polarizing film and the standard deviation of the crossed transmittance in the widthwise direction at a measurement wavelength of 440 nm were measured. Results of the measurement were as shown in Table 1.

Example 12

A polarizing film was obtained in the same manner as in Example 1 except that a PVA film (made by Kuraray Co., Ltd., polymerization degree: 2400) having an width of initial raw film of 1200 mm was used and that the stretching distance in each of the swelling and stretching steps was changed to 2400 mm, the stretching distance in the dyeing step was changed to 1800 mm and the stretching distance in the crosslinking step was changed to 600 mm. The single transmittance and crossed transmittance of the obtained polarizing film, the polarizing efficiency of the polarizing film and the standard deviation of the crossed transmittance in the widthwise direction at a measurement wavelength of 440 nm were measured. Results of the measurement were as shown in Table 1.

Example 13

A polarizing film was obtained in the same manner as in Example 1 except that a PVA film (made by Kuraray Co., Ltd., polymerization degree: 2400) having an width of initial raw film of 100 mm was used and that the film was stretched to 3.5 times (at a stretching distance of 1000 mm) in the swelling step and stretched to have a total stretching ratio of 5.5 (at a stretching distance of 600 mm) in the stretching step but was not stretched in the other steps. The single transmittance and crossed transmittance of the obtained polarizing film, the polarizing efficiency of the polarizing film and the standard deviation of the crossed transmittance in the widthwise direction at a measurement wavelength of 440 nm were measured. Results of the measurement were as shown in Table 1.

Example 14

A polarizing film was obtained in the same manner as in Example 1 except that a PVA film (made by Kuraray Co., Ltd., polymerization degree: 2400) having an width of initial raw film of 1200 mm was used and that the film was stretched to 3.5 times (at a stretching distance of 1000 mm) in the swelling step and stretched to have a total stretching ratio of 5.5 (at a stretching distance of 4500 mm) in the stretching step but was not stretched in the other steps. The single transmittance and crossed transmittance of the obtained polarizing film, the polarizing efficiency of the polarizing film and the standard deviation of the crossed transmittance in the widthwise direction at a measurement wavelength of 440 nm were measured. Results of the measurement were as shown in Table 1.

Example 15

A polarizing film was obtained in the same manner as in Example 1 except that a PVA film (made by Kuraray Co., Ltd., polymerization degree: 2400) having an width of initial raw film of 2300 mm was used and that the film was stretched to 3.5 times (at a stretching distance of 1000 mm) in the swelling step and stretched to have a total stretching ratio of 5.5 (at a stretching distance of 4500 mm) in the stretching step but was not stretched in the other steps. The single transmittance and crossed transmittance of the obtained polarizing film, the polarizing efficiency of the polarizing film and the standard deviation of the crossed transmittance in the widthwise direction at a measurement wavelength of 440 nm were measured. Results of the measurement were as shown in Table 1.

Comparative Example 1

A polarizing film was obtained in the same manner as in Example 1 except that the stretching distance in each of the swelling, dyeing, crosslinking and stretching steps in Example 1 was changed to 40 mm. The single transmittance and crossed transmittance of the obtained polarizing film, the polarizing efficiency of the polarizing film and the standard deviation of the crossed transmittance in the widthwise direction at a measurement wavelength of 440 nm were measured. Results of the measurement were as shown in Table 1.

Comparative Example 2

A polarizing film was obtained in the same manner as in Example 1 except that a PVA film (made by Kuraray Co., Ltd., polymerization degree: 2400) having an width of initial raw film of 2300 mm was used and that the stretching distance in each of the swelling, dyeing, crosslinking and stretching steps in Example 1 was changed to 800 mm. The single transmittance and crossed transmittance of the obtained polarizing film, the polarizing efficiency of the polarizing film and the standard deviation of the crossed transmittance in the widthwise direction at a measurement wavelength of 440 nm were measured. Results of the measurement were as shown in Table 1.

Comparative Example 3

A polarizing film was obtained in the same manner as in Example 1 except that a PVA film (made by Kuraray Co., Ltd., polymerization degree: 2400) having an width of initial raw film of 2300 mm was used and that the film was stretched to 3.5 times (at a stretching distance of 800 mm) in the swelling step and stretched to have a total stretching ratio of 5.5 (at a stretching distance of 1000 mm) in the stretching step but was not stretched in the other steps. The single transmittance and crossed transmittance of the obtained polarizing film, the polarizing efficiency of the polarizing film and the standard deviation of the crossed transmittance in the widthwise direction at a measurement wavelength of 440 nm were measured. Results of the measurement were as shown in Table 1.

Method of Measuring Optical Characteristic (Measuring Methods of Transmission Rate and Polarizing Efficiency)

Figure 3:
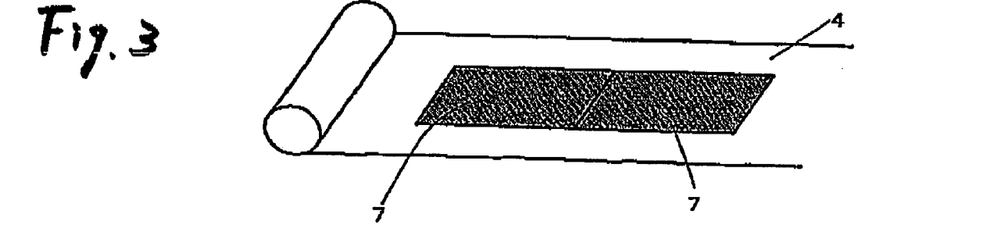
FIG. 3 is a perspective illustration showing a position of measuring samples.

As shown in FIG. 3, the polarizing film produced in each of Examples and Comparative Examples was cut out, at a center position in width direction by a size of 50 mm-length in stretching direction×25 mm-length in width direction, to obtain two measuring samples adjoining in stretching direction. Single transmittance, parallel transmittance ($H_0$) and crossed transmittance ($H_{90}$) were measured by use of a spectrophotometer (DOT-3, manufactured by Murakami Color Research Laboratory). The polarizing efficiency was calculated on the basis of the measured values by the following expression. Incidentally, these values of transmittance were Y values after visibility was corrected by double view field (C light source) in accordance with JISZ-8701.

$$\text{Polarizing efficiency (\%)} = \{(H_0 - H_{90})/(H_0 + H_{90})\}^{1/2} \times 100$$

Measuring Method of Standard Deviation of Crossed Transmittance

Figure 4:
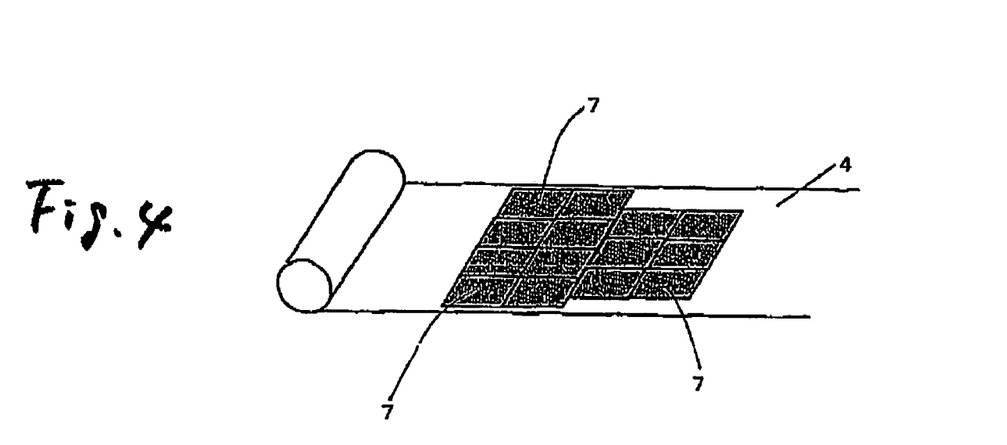
FIG. 4 is a perspective illustration showing a position of measuring samples.

As shown in FIG. 4, the polarizing film produced in each of Examples and Comparative Examples was cut out in such a manner that positions of a sample were displaced to width direction to other sample by half length of the width of the sample, by a size of 50 mm-length in stretching direction×25 mm-length in width direction, to measure crossed transmittance of samples at intervals of 12.5 cm to the width direction. Two samples, at the same position in width direction, adjoining in stretching direction are overlapped each other so that the absorption axes of the two samples cross each other at 90°. Values of crossed transmittance of the samples due to light with a wavelength of 440 nm at the center position of the sample were measured by use of the spectrophotometer. The standard deviation of the crossed transmittance was calculated. Three samples were obtained from a resulting polarizing film that was formed from an initial raw film having 100 mm-width. About 47 samples were obtained from a resulting polarization film that was formed from an initial raw film having 1200 mm-width. About 91 samples were obtained from a resulting polarization film that was formed from an initial raw film having 2300 mm-width.

As is obvious from results shown in Table 1, it is found that a polarizing film having a crossed transmittance of not more than 0.050%, a polarizing efficiency of not less than 99.90% and a dispersion of crossed transmittance in width distance (standard deviation) of not more than 0.100 can be obtained when the ratio L/W of the stretching distance L to the width of initial raw film W is in a range of from 0.5 to 30 in at least one step of the process including the stretching step. Therefore, a polarizing film obtained by the present invention is excellent in the crossed transmittance, the polarizing efficiency and the standard deviation of crossed transmittance at a measurement wavelength of 440 nm. Thereby, a polarizing film excellent in uniformity in in-plane optical characteristic as well as excellent in optical characteristic can be obtained.

As described above, in the method for producing a polarizing film according to the present invention, the stretching distance in the stretching step is defined on the basis of the ratio of the stretching distance to the width of initial raw film before performing producing steps of a polarizing film to thereby obtain a polarizing film high in the orientation degree and uniform in in-plane optical characteristic regardless of the width of the raw film. Accordingly, a polarizing film adapted to a large-size image display device free from display unevenness and good in display characteristic can be provided.

While the present invention has been described in detail and with reference to specific embodiments thereof, it will be apparent to one skilled in the art that various changes and modifications can be made therein without departing the spirit and scope thereof.

The present application is based on Japanese Patent Application No. 2003-121906 filed on Apr. 25, 2003, and the contents thereof are incorporated herein by reference.

What is claimed is:

1. A process for producing a polarizing film comprising at least one step of stretching a film having a length and a width,

TABLE 1

| | L/W [—] | | | | Single transmittance [%] | Crossed transmittance [%] | Degree of polarization [%] | Standard deviation of crossed transmittance due to light with a wavelength of 400 nm |
|---|---|---|---|---|---|---|---|---|
| | Swelling step | Dyeing step | Cross-linking step | Stretching step | | | | |
| Example 1 | 0.6 | 0.6 | 0.6 | 0.6 | 44.0 | 0.037 | 99.90 | 0.074 |
| Example 2 | 1.0 | 1.0 | 1.0 | 1.0 | 44.0 | 0.033 | 99.91 | 0.062 |
| Example 3 | 2.0 | 2.0 | 2.0 | 2.0 | 44.0 | 0.025 | 99.93 | 0.043 |
| Example 4 | 3.0 | 3.0 | 3.0 | 3.0 | 44.0 | 0.021 | 99.94 | 0.032 |
| Example 5 | 4.5 | 4.5 | 4.5 | 4.5 | 44.0 | 0.017 | 99.95 | 0.028 |
| Example 6 | 6.0 | 6.0 | 6.0 | 6.0 | 44.0 | 0.017 | 99.95 | 0.026 |
| Example 7 | 8.0 | 8.0 | 8.0 | 8.0 | 44.0 | 0.017 | 99.95 | 0.025 |
| Example 8 | 10.0 | 10.0 | 10.0 | 10.0 | 44.0 | 0.016 | 99.95 | 0.023 |
| Example 9 | 3.8 | 3.8 | 3.8 | 3.8 | 44.0 | 0.017 | 99.95 | 0.034 |
| Example 10 | 2.0 | 2.0 | 2.0 | 2.0 | 44.0 | 0.029 | 99.92 | 0.058 |
| Example 11 | 1.5 | 1.5 | 0.5 | 2.0 | 44.0 | 0.030 | 99.92 | 0.055 |
| Example 12 | 2.0 | 1.5 | 0.5 | 2.0 | 44.0 | 0.026 | 99.93 | 0.049 |
| Example 13 | 10.0 | — | — | 6.0 | 44.0 | 0.017 | 99.95 | 0.027 |
| Example 14 | 0.8 | — | — | 3.8 | 44.0 | 0.021 | 99.94 | 0.040 |
| Example 15 | 0.4 | — | — | 2.0 | 44.0 | 0.025 | 99.93 | 0.043 |
| Comparative Example 1 | 0.4 | 0.4 | 0.4 | 0.4 | 44.0 | 0.057 | 99.85 | 0.114 |
| Comparative Example 2 | 0.3 | 0.3 | 0.3 | 0.3 | 44.0 | 0.061 | 99.84 | 0.122 |
| Comparative Example 3 | 0.3 | — | — | 0.4 | 44.0 | 0.064 | 99.82 | 0.130 | wherein the at least one step of stretching a film is each carried out by a wet stretching method and satisfies that the ratio (L/W) of stretching distance (L) to width of initial raw film (W) is from 0.5 to 30, wherein the stretching distance (L) is a distance between portions on which force necessary for stretching is applied in the length direction of the film, the stretching force being applied through stretching rollers located at a fixed distance from each other, and width (W) is a width of the raw film measured in the width direction of the film before a series of polarizing film producing steps are executed.

2. A polarizing film produced by the process according to claim 1, which has a value of the standard deviation of crossed transmittances measured at a measurement wavelength of 440 nm of less than 0.100.

3. The polarizing film according to claim 2, wherein the polarizing film has a polarizing efficiency of not lower than 99.90%.

4. The polarizing film according to claim 2, wherein the polarizing film has a crossed transmittance of not higher than 0.050%.

5. An optical film comprising the polarizing film according to claim 2 and at least one optical layer.

6. An image display device comprising the optical film according to claim 5.

7. An image display device comprising the polarizing film according to claim 2.

8. The polarizing film according to claim 2, which has a polarizing efficiency of not less than 99.93.

9. The polarizing film according to claim 2, which has a polarizing efficiency of not less than 99.94.

10. The polarizing film according to claim 2, which has a polarizing efficiency of not less than 99.95.

11. The polarizing film according to claim 2, which has a crossed transmittance of not higher than 0.021%.

12. The polarizing film according to claim 2, which has a crossed transmittance of not higher than 0.017%.

13. The polarizing film according to claim 2, wherein the polarizing film has a single transmittance of not less than 43%.

14. The polarizing film according to claim 2, wherein the polarizing film has a single transmittance of from 43.3% to 45.0%.

15. The polarizing film according to claim 2, wherein the polarizing film has a single transmittance of from 44.0% to 45.0%.

16. The polarizing film according to claim 2, wherein the polarizing film has a value of the standard deviation of crossed transmittance measured at a measurement wavelength of 440 nm of less than 0.060.

17. The process for producing a polarizing film according to claim 1, wherein the raw film comprises a polyvinyl alcohol.

18. The process for producing a polarizing film according to claim 1, wherein the total stretching ratio of the polarizing film is from 3.0 to 7.0.

19. The process for producing a polarizing film according to claim 1, wherein the ratio (L/W) is from 1 to 15.

20. The process for producing a polarizing film according to claim 1, wherein the ratio (L/W) is from 2 to 13.

21. The process for producing a polarizing film according to claim 1, wherein the ratio (L/W) is from 3 to 30.

22. The process for producing a polarizing film according to claim 1, wherein the ratio (L/W) is from 4.5 to 30.

23. The process for producing a polarizing film according to claim 1, wherein the ratio (L/W) is from 6 to 30.

24. The process for producing a polarizing film according to claim 1, wherein the cumulative stretching ratio up to the at least one step of stretching a film is each not less than 2.5.

25. The process for producing a polarizing film according to claim 1, wherein the polarizing film has a value of the standard deviation of crossed transmittances measured at a measurement wavelength of 440 nm of less than 0.060.

26. The process for producing a polarizing film according to claim 1, wherein the ratio (L/W) is from 3 to 13.

27. The process for producing a polarizing film according to claim 1, wherein the at least one step of stretching a film is carried out in a solution containing potassium iodide.

28. The process for producing a polarizing film according to claim 1, wherein the at least one step of stretching a film includes a stretching step; and the stretching distance (L) in the stretching step is 100 to 4500 mm.

29. The process for producing a polarizing film according to claim 1, wherein the at least one step of stretching a film includes a stretching step; and the stretching step is carried out in a solution containing 2 to 18% by weight of potassium iodide.

30. The process for producing a polarizing film according to claim 1, wherein the at least one step of stretching a film is carried out in a solution containing boric acid.

31. The process for producing a polarizing film according to claim 1, wherein the at least one step of stretching a film includes a stretching step; and the stretching step is carried out in a solution containing 2 to 18% by weight of boric acid.

32. The process for producing a polarizing film according to claim 1, wherein the at least one step of stretching a film includes a stretching step; the stretching step is carried out in a solution containing boric acid and potassium iodide; and the rate (weight ratio) of the boric acid to the potassium iodide is from 1:0.1 to 1:4.

33. The process for producing a polarizing film according to claim 1, wherein the at least one step of stretching a film includes a stretching step; and the stretching step is carried out at a temperature of from 40 to 67° C.

34. The process for producing a polarizing film according to claim 1, wherein the at least one step of stretching a film includes a swelling step.

35. The process for producing a polarizing film according to claim 34, wherein the stretching ratio on the swelling step is from 1.1 to 3.5.

36. The process for producing a polarizing film according to claim 34, wherein the stretching distance (L) in the swelling step is from 100 to 4500 mm.

37. The process for producing a polarizing film according to claim 1, wherein the at least one step of stretching a film includes a dyeing step.

38. The process for producing a polarizing film according to claim 37, wherein the stretching distance (L) in the dyeing step is from 100 to 4500 mm.

39. The process for producing a polarizing film according to claim 1, wherein the at least one step of stretching a film includes a crosslinking step.

40. The process for producing a polarizing film according to claim 39, wherein the crosslinking step is carried out in a solution containing from 1 to 10% by weight of a crosslinking agent.

41. The process for producing a polarizing film according to claim 39, wherein a crosslinking agent used in the crosslinking step is boric acid.

42. The process for producing a polarizing film according to claim 39, wherein the crosslinking step step is carried out in a solution containing from 0.5 to 8% by weight of iodide.

43. The process for producing a polarizing film according to claim 39, wherein the stretching distance (L) in the crosslinking step is from 100 to 4500 mm.

44. The process for producing a polarizing film according to claim 39, wherein the crosslinking step is carried out in a solution containing boric acid and potassium iodide; and the rate (weight ratio) of the boric acid to the potassium iodide is from 1:0.1 to 1:3.5.

45. The process for producing a polarizing film according to claim 1, wherein the at least one step of stretching a film includes a water-washing step; and the water-washing step is carried out in a solution containing iodide.

46. The process for producing a polarizing film according to claim 45, wherein the solution contains from 0.1 to 10% by weight of iodide.

47. The process for producing a polarizing film according to claim 1, wherein the ratio (L/W) is from 2 to 30.

48. The process for producing a polarizing film according to claim 1, wherein a total stretching ratio of the polarizing film is from 3.5 to 7.0.

49. A process for producing a polarizing film comprising at least one step of stretching a film having a length and a width,
wherein the at least one step of stretching a film is each carried out by a wet stretching method and satisfies that the ratio (L/W) of stretching distance (L) to width of initial raw film (W) is from 2 to 30, wherein the stretching distance (L) is a distance between portions on which force necessary for stretching is applied in the length direction of the film, and width (W) is a width of the raw film measured in the width direction of the film before a series of polarizing film producing steps are executed.

* * * * *